US008179252B2

(12) United States Patent
Harrell

(10) Patent No.: US 8,179,252 B2
(45) Date of Patent: May 15, 2012

(54) TORNADO ALARM SYSTEM

(76) Inventor: Pamela Lynn Harrell, Woodstock, GA (US)

(*) Notice: Subject to any disclaimer, the term of this patent is extended or adjusted under 35 U.S.C. 154(b) by 0 days.

(21) Appl. No.: 12/794,644

(22) Filed: Jun. 4, 2010

(65) Prior Publication Data
US 2010/0245095 A1 Sep. 30, 2010

Related U.S. Application Data

(63) Continuation-in-part of application No. 11/934,118, filed on Nov. 2, 2007, now abandoned.

(51) Int. Cl.
G08B 1/08 (2006.01)
H04B 1/16 (2006.01)
H04B 1/18 (2006.01)

(52) U.S. Cl. ............... 340/539.1; 340/539.21; 455/227; 455/185.1

(58) Field of Classification Search ............ 340/539.1
See application file for complete search history.

(56) References Cited

U.S. PATENT DOCUMENTS

| | | | | |
|---|---|---|---|---|
| 4,031,467 A * | 6/1977 | Singleton et al. | ............. | 455/526 |
| 4,079,317 A * | 3/1978 | Baird | ............. | 455/140 |
| 4,812,825 A | 3/1989 | Kennedy et al. | | |
| 5,546,800 A | 8/1996 | Daniel | | |
| 5,781,852 A * | 7/1998 | Gropper | ............. | 455/227 |
| 5,801,636 A | 9/1998 | Tatom et al. | | |
| 6,018,699 A | 1/2000 | Baron, Sr. et al. | | |
| 6,034,608 A | 3/2000 | Frank et al. | | |
| 6,125,328 A | 9/2000 | Baron et al. | | |
| 6,295,001 B1 | 9/2001 | Barber | | |
| 6,351,218 B1 | 2/2002 | Smith | | |
| 6,462,665 B1 * | 10/2002 | Tarlton et al. | ............. | 340/601 |
| 6,710,715 B2 * | 3/2004 | Deeds | ............. | 340/601 |
| 6,992,990 B2 * | 1/2006 | Sakusabe | ............. | 370/293 |
| 7,050,784 B2 * | 5/2006 | Clark | ............. | 455/404.1 |
| 7,088,254 B2 | 8/2006 | Liebenow | | |
| 2005/0159132 A1 * | 7/2005 | Wright et al. | ............. | 455/404.1 |
| 2005/0227672 A1 * | 10/2005 | Lauzon et al. | ............. | 455/412.2 |
| 2006/0184962 A1 * | 8/2006 | Kendall et al. | ............. | 725/33 |

* cited by examiner

Primary Examiner — Brent Swarthout
Assistant Examiner — John Mortell
(74) Attorney, Agent, or Firm — Bradley D. Crose

(57) ABSTRACT

A severe weather alarm configured for actuation by the occurrence of a single type of weather phenomena is disclosed. In one embodiment an alarm includes a portable housing; an audio siren configured to actuate upon an occurrence of a predetermined event; a receiver to receive signals and Specific Area Message Encoding (SAME) messages at one or more National Weather Service (NWS) weather radio frequencies; a digital decoder coupled to the receiver and configured to filter out all SAME messages except for a single weather warning message event code and a Required Weekly Test (RWT) code; a processor coupled to the receiver and the digital decoder to control the receiver and decoder and to actuate the audio siren upon the occurrence of the predetermined event; a power source; and a memory for storing signal values, frequencies, message values, and geographical codes.

16 Claims, 10 Drawing Sheets

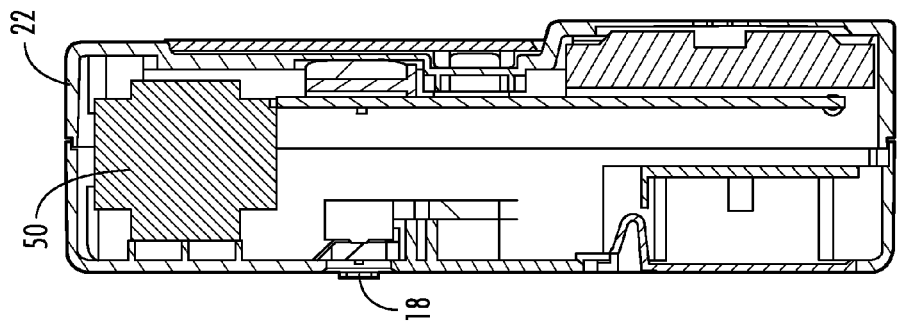
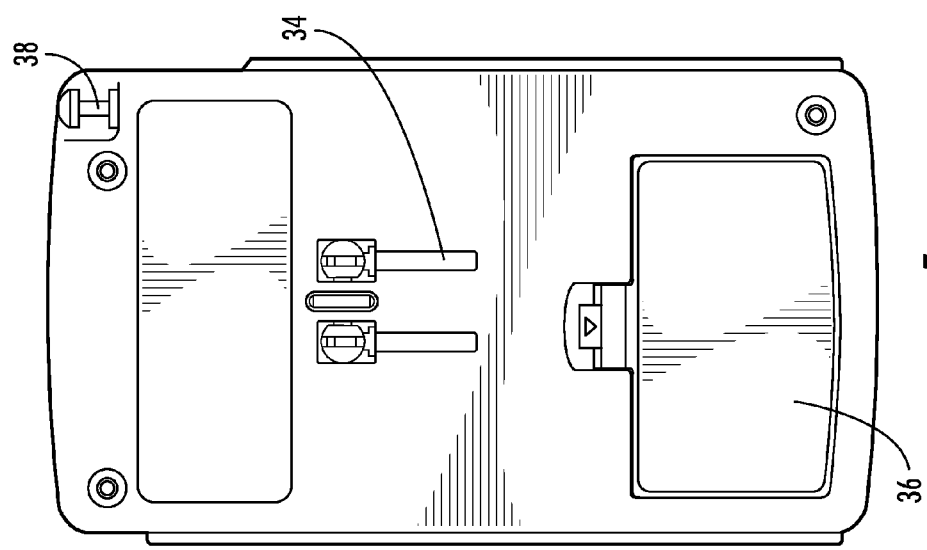
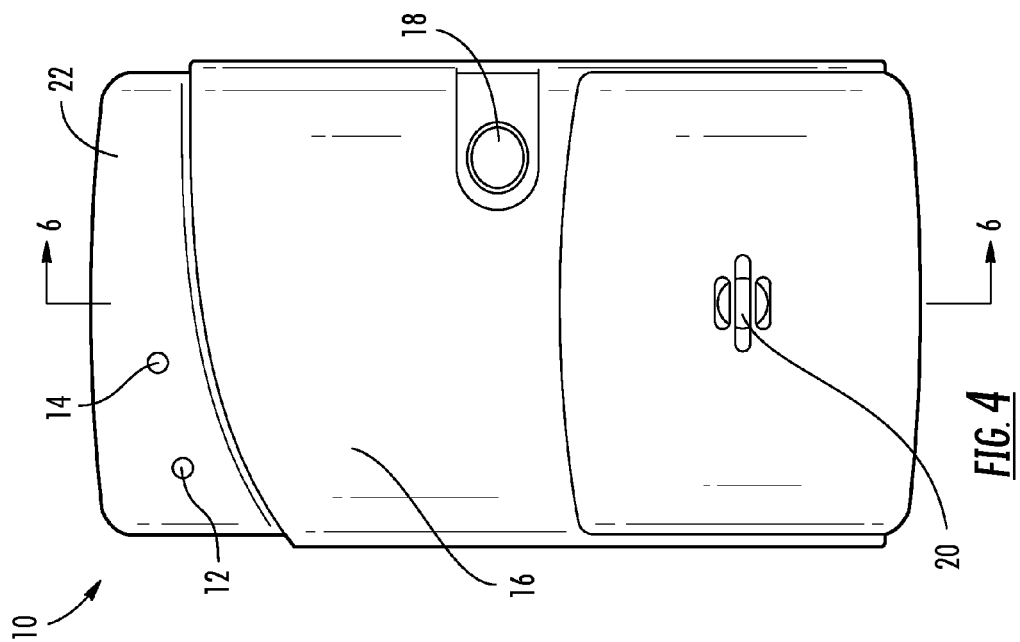

TORNADO ALARM SYSTEM

CROSS-REFERENCE TO RELATED APPLICATION(S)

This present non-provisional patent application is a continuation-in-part of U.S. patent application Ser. No. 11/934,118, filed on May 14, 2009, and entitled "TORNADO ALARM SYSTEM," and of which the application cited above is incorporated in-full by reference herein.

FIELD OF THE INVENTION

The technology described herein relates generally to alert systems for inclement weather. More specifically, this technology relates to a tornado alarm system that actuates a warning siren in response to National Weather Service radio signals that indicate a tornado or like severe weather warning.

BACKGROUND OF THE INVENTION

A tornado is a violently rotating column of air, typically visible as a funnel cloud underneath a cumuliform cloud. Tornados are the most serious form of atmospheric phenomena and can cause extensive property damage and serious injury and death to persons. Weather forecasting is not a perfect science. Some tornadoes can occur without a tornado warning by weather forecasters. Some tornado warning devices, with various deficiencies and limitations, are known in the art.

While commercial tornado alarm devices are available to counties and cities in our country, they are typically strategically located near schools and larger populated areas. In some instances the cost of the commercial alarm system is too expensive for consideration. When a warning triggers a commercial device, only individuals within a closer proximity of the tornado siren will hear it. If a tornado siren activates during nighttime hours, and a person is asleep, the siren may not be heard at all.

Tornado warning devices and systems known in the art also include, for example, those integrated with a traditional weather radio. A known disadvantage of the weather radio system is that the warning is a synthesized voice message that discontinues after three announcements, and is not specific to one event. Further, as many individuals become desensitized over time to the multiple alert events and ultimately come to ignore the alerts, the device is turned off or the volume is lowered.

Related patents and published patent applications known in the art include the following: U.S. Pat. No. 4,031,467 issued to Singleton Jr. et al. on Jun. 21, 1977, discloses an alerting process and system of apparatus thereof. U.S. Pat. No. 4,812,825 issued to Kennedy et al. on Mar. 14, 1989, discloses a tornado warning system. U.S. Pat. No. 5,546,800 issued to Daniel on Aug. 20, 1996, discloses an early warning tornado detector. U.S. Pat. No. 5,781,852 issued to Gropper on Jul. 14, 1998, discloses an alert receiver interface. U.S. Pat. No. 5,801,636 issued to Tatom et al. on Sep. 1, 1998, discloses a method and apparatus for seismic tornado detection. U.S. Pat. No. 6,018,699 issued to Baron, Sr. et al. on Jan. 25, 2000, discloses systems and methods for distributing real-time site specific weather information. U.S. Pat. No. 6,034,608 issued to Frank et al. on Mar. 7, 2000, discloses a tornado alarm system. U.S. Pat. No. 6,125,328 issued to Baron et al. on Sep. 26, 2000, discloses a system and method for projecting storms using NEXRAD attributes. U.S. Pat. No. 6,295,011 issued to Barber on Sep. 25, 2001, discloses a tornado warning system. U.S. Pat. No. 6,351,218 issued to Smith on Feb. 26, 2002, discloses a method and apparatus for activating weather warning devices. U.S. Pat. No. 7,050,784 issued to Clark on May 23, 2006, discloses a weather radio channel acquisition system. U.S. Pat. No. 7,088,254 issued to Liebenow on Aug. 8, 2006, discloses a system and method for providing a device with protection from a weather event. U.S. Patent Application Publication No. 2005/0159132, filed by Wright et al. and published on Jul. 21, 2005, discloses a wireless device with integrated emergency alert notification.

The foregoing patent information reflects the state of the art of which the inventor is aware and is tendered with a view toward discharging the inventor's acknowledged duty of candor in disclosing information that may be pertinent to the patentability of the technology described herein. It is respectfully stipulated, however, that the foregoing patent and other information do not teach or render obvious, singly or when considered in combination, the inventor's claimed invention.

BRIEF SUMMARY OF THE INVENTION

In various exemplary embodiments, the technology described herein provides a tornado alarm system, and associated methods, that actuates a warning siren in a personal electronic device in response to National Weather Service radio signals that indicate a tornado or like severe weather warning.

In one exemplary embodiment, the technology described herein provides a single event severe weather alarm. The alarm includes: a portable electronic device housing; an audio siren, having a volume, disposed within the housing and configured to actuate upon an occurrence of a predetermined event; a receiver disposed within the housing to receive signals and Specific Area Message Encoding (SAME) messages at one or more National Weather Service (NWS) weather radio frequencies; a digital decoder disposed within the housing coupled to the receiver and configured to filter out all SAME messages except for a single weather warning message event code and a Required Weekly Test (RWT) code; a processor coupled to the receiver and the digital decoder to control the receiver and decoder and to actuate the audio siren upon the occurrence of the predetermined event; a power source; and a memory for storing a plurality of signal values and frequencies, a plurality of message values, and a plurality of geographical codes, even after an interruption in the power source. In at least one embodiment, the single warning message event code is the Tornado Warning code (TOR). In at least one embodiment, the audio siren is preset to remain unmanipulated by an operator, and thus not raised, lowered, or turned off. In at least one embodiment, the processor is configured to automatically select the frequency of reception of the receiver based on a geographical location and a signal strength indication.

The single event severe weather alarm also can include: a user interface coupled to the processor; a visual display coupled to the user interface; and a signal strength indicator visible on the visual display. In this embodiment, the processor is configured to allow an operator, through the user interface, to select the frequency of reception of the receiver based on a frequency determination from review of the signal strength indicator.

The single event severe weather alarm further can include: a county code indicator visible on the visual display. In this embodiment, the processor is configured to allow an operator, through the user interface, to select an applicable county code based on a geographical location or to leave the county code field without a data input in order to default to all counties within a local range of the weather alarm.

The single event severe weather alarm also can include: a sub-county code indicator visible on the visual display, indicative of a region within a county. In this embodiment, the processor is configured to allow an operator, through the user interface, to select an applicable sub-county code based on geography or to leave the sub-county code field without a data input in order to default to all regions within a county.

The single event severe weather alarm further can include: a software implemented logic circuit coupled to the digital decoder and configured to filter out all SAME messages except for single the warning message event code and the Required Weekly Test (RWT) code. In this embodiment, the processor is configured to deny access by an operator of the single event severe weather alarm to the digital decoder.

The single event severe weather alarm also can include: a battery backup system disposed within the housing to provide power to the single event severe weather alarm and to provide portability of the single event severe weather alarm.

The single event severe weather alarm further can include: a user interface coupled to the processor, the user interface having a "mute" selection, a "back" selection, an "enter" selection, a "frequency" selection, and a "county" selection; and a visual display coupled to the user interface.

The single event severe weather alarm also can include: a test indicator light, controlled by the processor, to indicate a current state of the single event severe weather alarm and to indicate whether the Required Weekly Test (RWT) code was processed properly. In at least one embodiment, the test indicator is configured to illuminate regularly in a first color and subsequently to change illumination to a second color upon receipt and process of the Required Weekly Test (RWT) code.

The single event severe weather alarm further can include: a retractable electrical prong assembly to plug the single event severe weather alarm into a traditional power source outlet and with which to mount the alarm flush to a wall surface.

The single event severe weather alarm also can include: a strobe light disposed with the housing to indicate to those who cannot hear that the siren has been activated.

The single event severe weather alarm also can include being hardwired into a traditional wiring system within a building; and wherein the power source is a power supply of the building.

In another exemplary embodiment, the technology described herein provides a tornado warning device. The tornado warning device includes: a portable electronic device housing; an audio siren, having a volume, disposed within the housing and configured to actuate upon an occurrence of a predetermined event; a receiver disposed within the housing to receive signals and Specific Area Message Encoding (SAME) messages at one or more National Weather Service (NWS) weather radio frequencies; a digital decoder disposed within the housing coupled to the receiver and configured to filter out all SAME messages except for a single weather warning message type of Tornado Warning code (TOR) and a Required Weekly Test (RWT) code; a processor coupled to the receiver and the digital decoder to control the receiver and decoder and to actuate the audio siren upon the occurrence of the predetermined event; a power source; a memory for storing a plurality of signal values and frequencies, a plurality of message values, and a plurality of geographical codes, even after an interruption in the power source; and a test indicator light, controlled by the processor, to indicate a current state of the single event severe weather alarm and to indicate whether the Required Weekly Test (RWT) code was processed properly, wherein the test indicator is configured to illuminate in a first color and to change illumination to a second color upon receipt and process of the Required Weekly Test (RWT) code.

The tornado warning device also can include: a user interface coupled to the processor, the user interface having at least a "mute" selection, a "back" selection, an "enter" selection, a "frequency" selection, and a "county" selection; a visual display coupled to the user interface; a signal strength indicator visible on the visual display, wherein the processor is configured to allow an operator, through the user interface, to select the frequency of reception of the receiver based on a frequency determination from review of the signal strength indicator; a county code indicator visible on the visual display, wherein the processor is configured to allow the operator, through the user interface, to select an applicable county code based on a geographic location or to leave the county code field without a data input in order to default to all counties with a local range of the weather alarm; and a sub-county code indicator visible on the visual display, indicative of a region within a county, wherein the processor is configured to allow the operator, through the user interface, to select an applicable sub-county code based on geography or to leave the sub-county code field without a data input in order to default to all regions within a county.

The tornado warning device further can include: a retractable electrical prong assembly to plug the single event severe weather alarm into a traditional power source outlet and with which to mount the alarm to a wall surface; a strobe light to indicate to those who cannot hear that the siren has been activated; a software implemented logic circuit coupled to the digital decoder and configured to filter out all SAME messages except for single the warning message event code and the Required Weekly Test (RWT) codes, wherein the processor is configured to deny access by an operator of the single event severe weather alarm to the digital decoder; and a battery backup system disposed within the housing to provide power to the single event severe weather alarm and to provide portability of the single event severe weather alarm. In this embodiment, the volume of the audio siren is preset to remain unmanipulated by an operator, and thus not raised, lowered, or turned off. In this embodiment, the processor is configured to automatically select the frequency of reception of the receiver based on geography and signal strength.

In another exemplary embodiment, the technology described herein provides a method to indicate the occurrence of a severe weather alert. The method includes: providing a single event severe weather alarm having: a portable electronic device housing; an audio siren, having a volume, disposed within the housing and configured to actuate upon an occurrence of a predetermined event; a receiver disposed within the housing to receive signals and Specific Area Message Encoding (SAME) messages at one or more National Weather Service (NWS) weather radio frequencies; a digital decoder disposed within the housing coupled to the receiver and configured to filter out all SAME messages except for a single weather warning message event code and a Required Weekly Test (RWT) code; a processor coupled to the receiver and the digital decoder to control the receiver and decoder and to actuate the audio siren upon the occurrence of the predetermined event; a power source; a memory for storing a plurality of signal values and frequencies, a plurality of message values, and a plurality of geographical codes, even after an interruption in the power source; and a test indicator light, controlled by the processor, to indicate a current state of the single event severe weather alarm and to indicate whether the Required Weekly Test (RWT) code was processed properly, wherein the test indicator is configured to illuminate in a first color and to change illumination to a second color upon receipt and process of the Required Weekly Test (RWT) code; determining whether a county code has been selected for the alarm; selecting, if not previously selected or if reselecting, a county code; filtering the receiver for the county code selected; receiving SAME messages; processing the received SAME messages to identify whether a single weather warning message event code has been received, and upon receipt of a single weather warning message event code to actuate the audio siren; and processing received SAME messages to identify whether a Required Weekly Test (RWT) code has been received, and upon receipt of the RWT code to actuate the test indicator light to indicate the state of the alarm and the last weekly test. In at least one embodiment of the method, the single warning message event code is the Tornado Warning code (TOR).

There has thus been outlined, rather broadly, the more important features of the technology in order that the detailed description thereof that follows may be better understood, and in order that the present contribution to the art may be better appreciated. There are additional features of the technology that will be described hereinafter and which will form the subject matter of the claims appended hereto. In this respect, before explaining at least one embodiment of the technology in detail, it is to be understood that the invention is not limited in its application to the details of construction and to the arrangements of the components set forth in the following description or illustrated in the drawings. The technology described herein is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the technology described herein.

Further objects and advantages of the technology described herein will be apparent from the following detailed description of a presently preferred embodiment which is illustrated schematically in the accompanying drawings.

BRIEF DESCRIPTION OF THE DRAWINGS

The technology described herein is illustrated with reference to the various drawings, in which like reference numbers denote like device components and/or method steps, respectively, and in which:

FIG. 4 is a front planar view of the tornado alarm system depicted in FIG. 1;

FIG. 5 is a rear planar view of the tornado alarm system depicted in FIG. 1, illustrating, in particular, the retractable electrical prongs in retracted position and the battery cavity area, according to an embodiment of the technology described herein;

FIG. 6 is a side, cross-sectional view of the tornado alarm system depicted in FIG. 1;

DETAILED DESCRIPTION OF THE INVENTION

Figure 1:
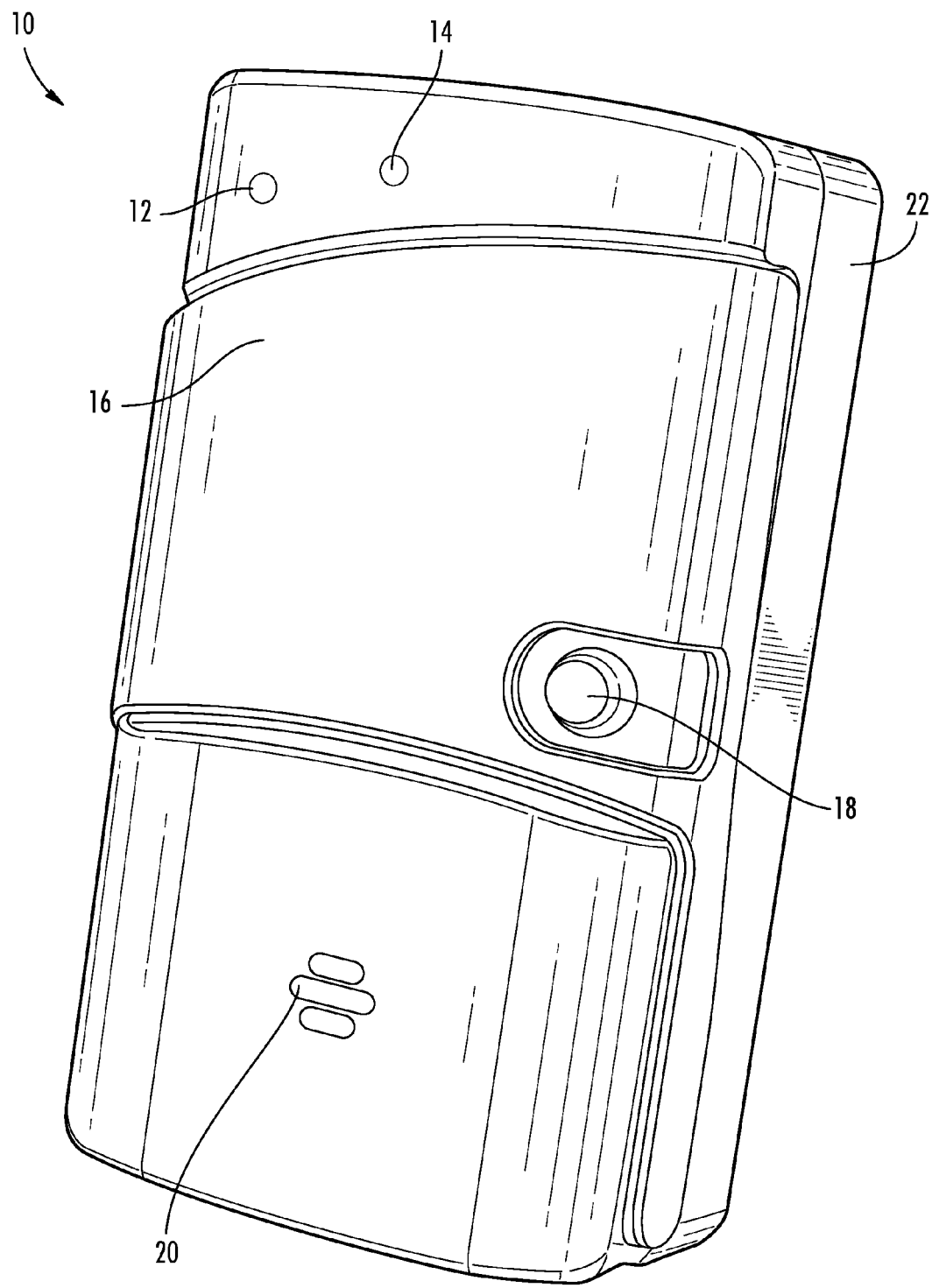
FIG. 1 is a front perspective view of a tornado alarm system, illustrating, in particular, a flip cover, mute button, status indicators, housing, and speaker, according to an embodiment of the technology described herein.
Figure 2:
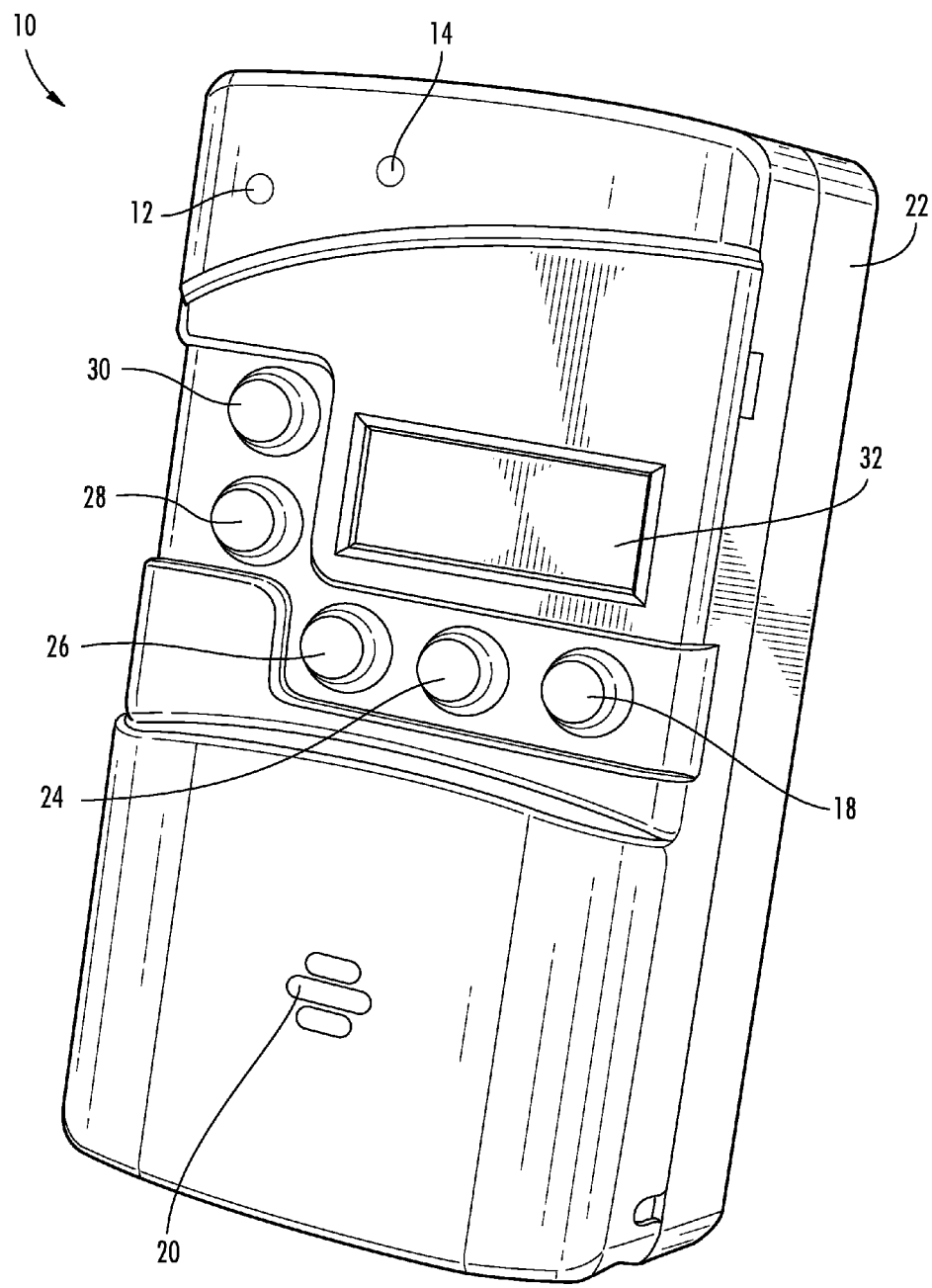
FIG. 2 is a front perspective view of the tornado alarm system depicted in FIG. 1, illustrating, in particular, the flip cover removed and a visual display area, according to an embodiment of the technology described herein.
Figure 3:
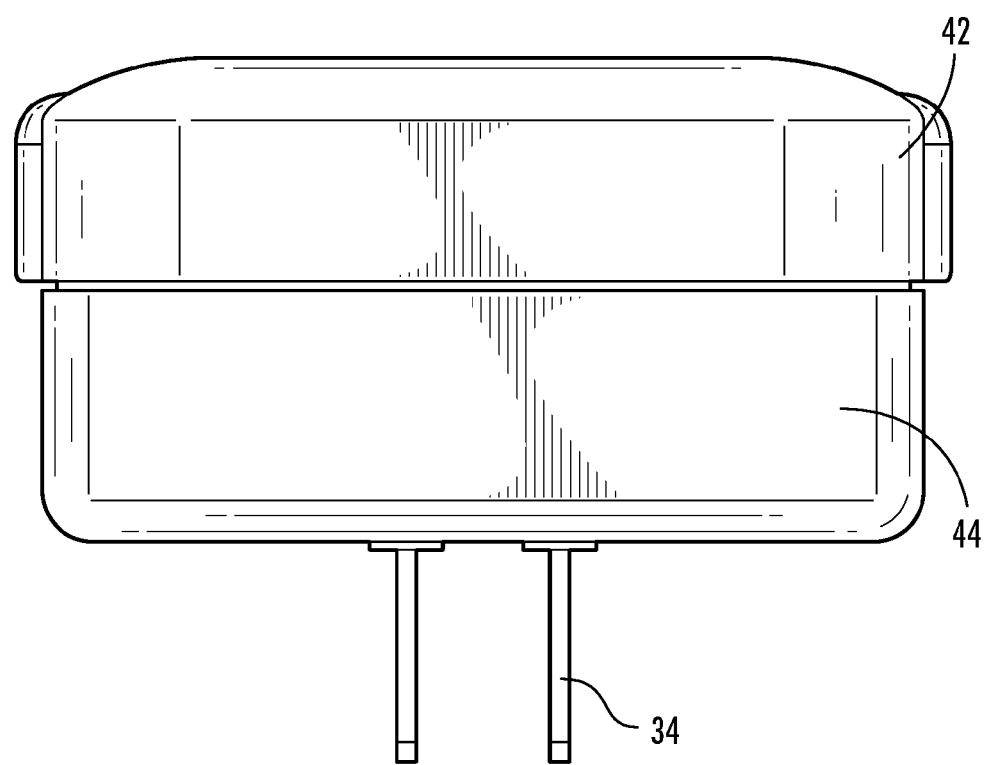
FIG. 3 is a top planar view of the tornado alarm system depicted in FIG. 1, illustrating, in particular, the retractable electrical prongs in an extended position, according to an embodiment of the technology described herein.
Figure 7:
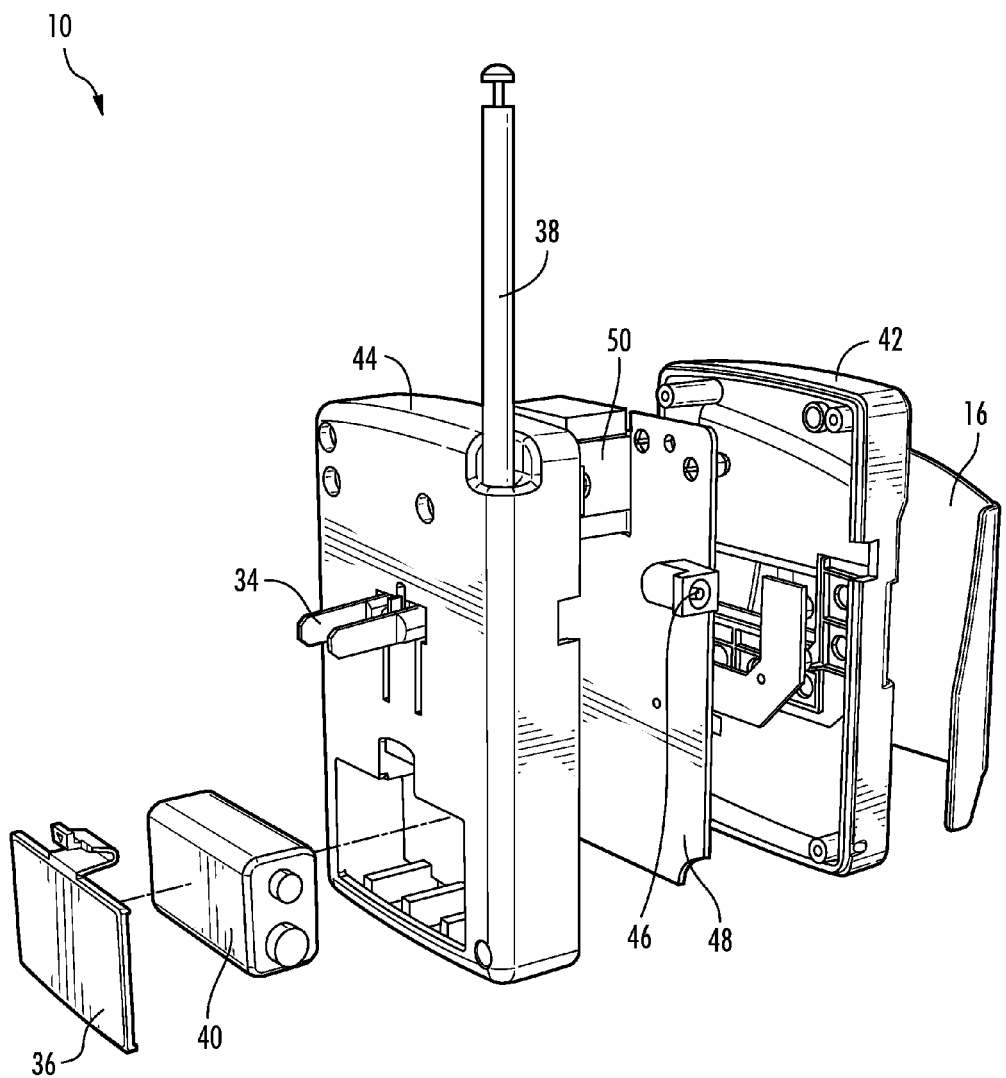
FIG. 7 is an expanded rear view of the tornado alarm system depicted in FIG. 1, illustrating, in particular, a circuit board and processor, according to an embodiment of the technology described herein.
Figure 8:
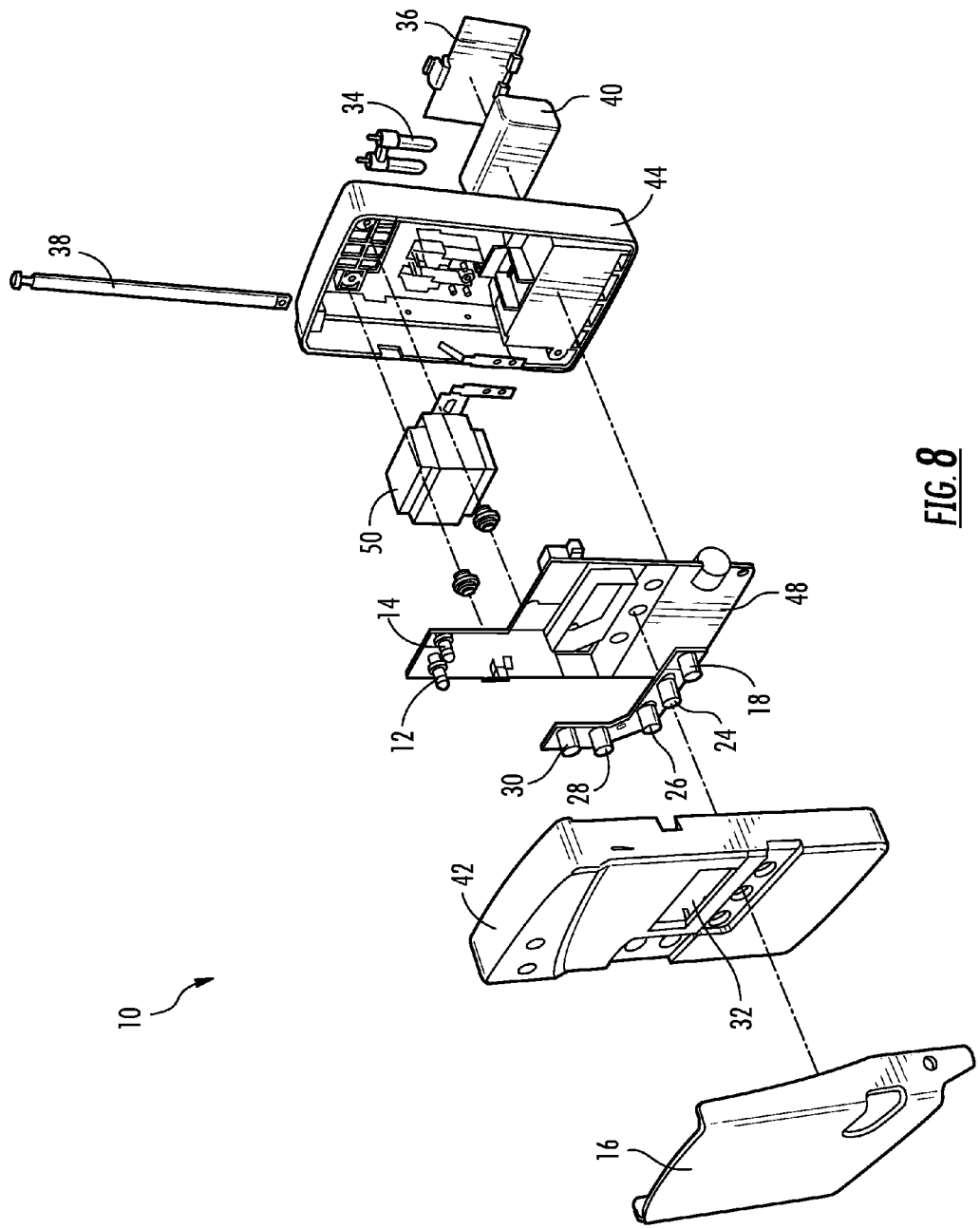
FIG. 8 is an expanded front view of the tornado alarm system depicted in FIG. 1, illustrating, in particular, a circuit board and processor, according to an embodiment of the technology described herein.
Figure 9:
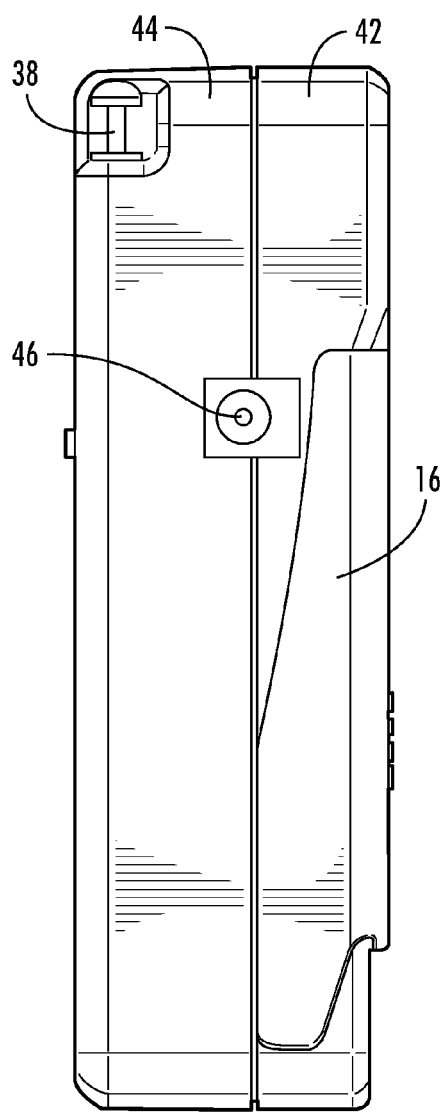
FIG. 9 is a left side view of the tornado alarm system depicted in FIG. 1, illustrating, in particular, a power source input jack, according to an embodiment of the technology described herein.
Figure 10:
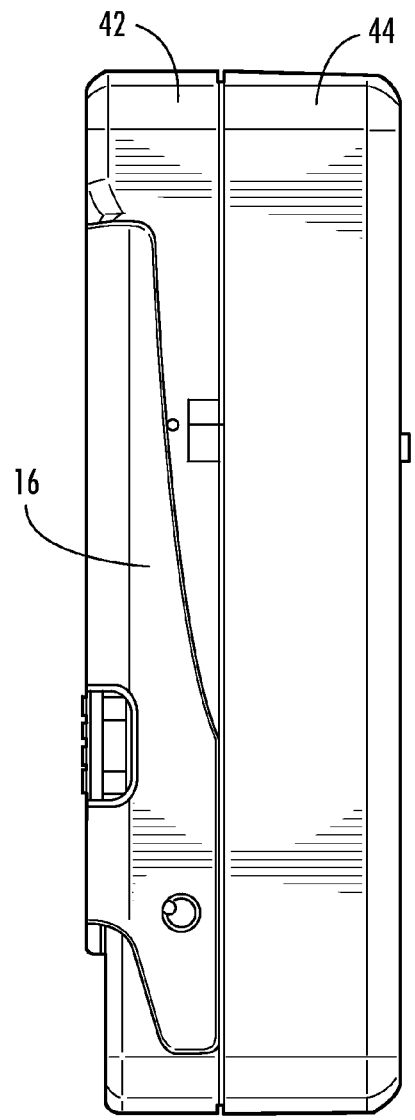
FIG. 10 is a right side view of the tornado alarm system depicted in FIG. 1.
Figure 11:
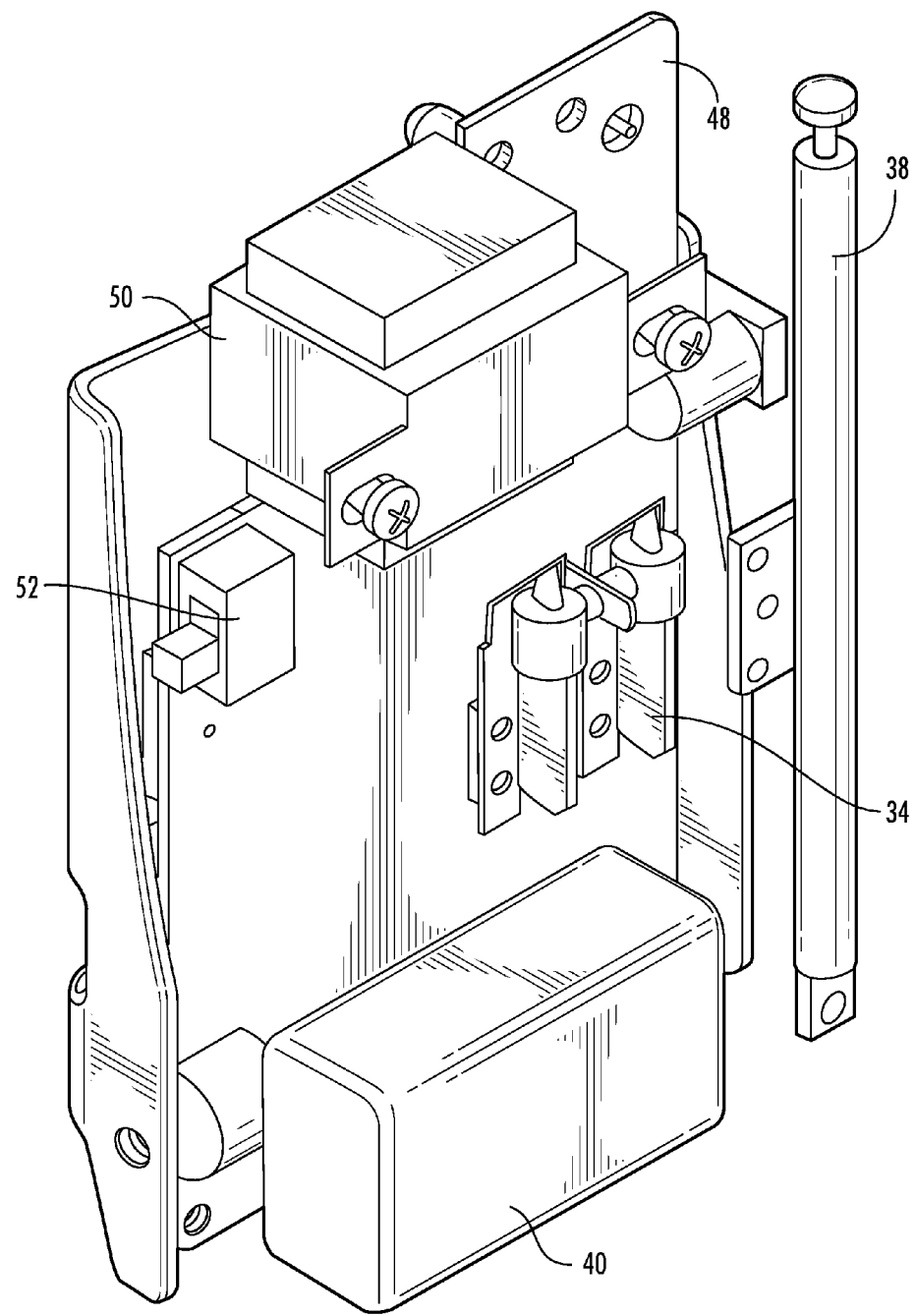
FIG. 11 is a rear perspective view of the tornado alarm system depicted in FIG. 1, illustrating, in particular, a removed rear cover, circuit board, processor, antenna, switch, battery, and retractable prongs, according to an embodiment of the technology described herein.

Before describing the disclosed embodiments of this technology in detail, it is to be understood that the technology is not limited in its application to the details of the particular arrangement shown here since the technology described is capable of other embodiments. Also, the terminology used herein is for the purpose of description and not of limitation.

In various exemplary embodiments, the technology described herein provides a single event severe weather alarm, such as a tornado alarm system, and associated methods, that actuates a warning siren in a personal electronic device in response to National Weather Service radio signals that indicate a tornado or like severe weather warning.

The technology described herein provides a device, such as the single event severe weather alarm, and associated methods, that operate somewhat analogously to a smoke detector. In a building, a smoke detector is actuated with the occurrence of smoke. Actuation of the detector typically results in a very loud siren to indicate to all persons present that smoke has been detected. Similarly, the single event severe weather alarm actuates a loud siren upon the occurrence of a specific weather phenomenon, such as, for example, the occurrence of an issued tornado warning from the National Weather Service, Tornado Warning (TOR) message code.

National Weather Service Specific Area Message Encoding (SAME) messages can include: Tornado Warning (TOR); Severe Thunderstorm Warning (SVR); Flash Flood Warning (FFW); Tornado Watch (TOA); Severe Thunderstorm Watch (SVA); Hurricane Watch (HUA); Hurricane Warning (HUW); and National Emergency (EAN 2). The SAME messages also, dependent on geographic location and other parameters, can include: Flash Flood Watch (FFA); Winter Storm Warning (WSW); High Wind Warning (HWW); Tsunami Watch (TSA); Tsunami Warning (TSW); River Flood Watch (FLA); and River Flood Warning (FLW).

By way of example, weather messages can be broadcast on the following weather channels, or frequencies: 162.400 MHz, 162.425 MHz, 162.450 MHz, 162.475 MHz, 162.500 MHz, 162.525 MHz, and 162.550.

Referring now to the Figures, a single event severe weather alarm 10 is depicted. The alarm 10 includes a housing 22 configured for containment of a portable electronic device. In at least one embodiment, the housing 22 includes both a front cover 42 and a back cover 44. The front cover 42 and back cover 44 can be opened one from another for internal access to the alarm 10. In at least one embodiment, the housing 22 includes a flip cover 16. The flip cover 16 protects a display 32 and buttons 24, 26, 28, 30 from unintentional use. However, the flip cover 16 provides for access to a "mute" button 18. The flip cover 16 can "slide" over for access or can "flip" open downwardly to provide access to the user interface buttons and display 32.

The alarm 10 includes an audio siren to very loudly indicate, once actuated, through loud speaker 20 that the occurrence of a specific weather phenomenon has occurred. By way of example, the siren can include a fire alarm style loud alarm with no voice. The front cover 42 includes a speaker grill such that loud speaker 20 provides an unblocked audio siren. Loud speaker 20 has a volume which, in one embodiment, the volume of the audio siren is preset to remain unmanipulated by an operator, and thus not raised, lowered, or turned off. In an alternative embodiment, the volume of the audio siren is adjustable by an operator. The audio siren can also audibly indicate that a battery power source is low. By way of example, the audio siren pattern of 100 ms ON and 500 ms OFF can be used to indicate that the battery is low.

The alarm 10 includes a power indicator 12. The power indicator 12 provides a visual cue to inform the viewer that the alarm 10 is either ON or OFF. The power indicator 12 can vary in color and illumination. By way of example, the power indicator 12 can be green when ON. Additionally, the power indicator 12 can blink rapidly in a particular manner, such as 300 ms ON and 700 ms OFF, to indicate that a battery source is low. The power indicator 12 is response to switch 52, with which the alarm 10 can be powered ON or OFF.

The alarm 10 includes a test/state indicator light 14. The test/state indicator light 14 is controlled by the processor 112 to indicate a current state of the single event severe weather alarm 10 and to indicate whether the Required Weekly Test (RWT) code was processed properly. In at least one embodiment, the test/state indicator 14 is configured to illuminate regularly in a first color and subsequently to change illumination to a second color upon receipt and process of the Required Weekly Test (RWT) code.

In at least one embodiment, the alarm 10 includes a strobe light. The strobe light is configured to illuminate in strobe fashion to indicate to one who cannot hear, or hear well, by providing a visual cue to inform the viewer that a specific weather phenomenon, such as, for example, the occurrence of an issued Tornado Warning (TOR) message code from the National Weather Service, has occurred. The strobe light can be coupled to one or more of the power indicator 12 and test/state indicator 14 lights, or, alternatively, can be a separate light on the surface of the alarm 10.

In at least one embodiment, the alarm 10 includes a retractable electrical prong assembly 34. The prong assembly 34 is configured to the severe weather alarm 10 into a traditional power source outlet receptacle. Once mounted in this manner, the alarm 10 is flush to a wall surface. The retractability of the prong assembly 34 allows from removal from a wall outlet, or the like, and portability, wherein power is then provided by an internal battery source.

In at least one alternative embodiment, the alarm 10 is configured for a more permanent "hardwired" installation. In this embodiment, the single event severe weather alarm 10 is hardwired into a traditional wiring system within a building. As such the power source is the power supply of the building as accessed through the building wiring network.

The alarm 10 includes an antenna 38. The antenna 38 is extendable to increase reception of radio tuner receiver 104. The antenna 38 is, for example, a whip antenna, well known in the background art. Alternative antenna configurations can be utilized to aid the receiver in signal reception.

The alarm 10 includes a power input jack 46. Power input jack 46 is configured to receive an AC adapter, car adapter, boat adapter, or the like. In this manner, the alarm 10 can be plugged into an alternate power source. Additionally, in this manner, a rechargeable battery, if utilized, can be recharged.

In at least one embodiment, the alarm 10 includes a battery backup system 40. The battery 40 is placed within the housing 22 such that it is concealed. The battery is utilized to provide power to the single event severe weather alarm 10 and to provide easy portability of the alarm 10. The battery 40 is inserted into the alarm 10 from under the battery cover 36 on the back 44 of the housing 22. The battery 40 can be replaceable. The battery 40 can be rechargeable. A single battery or multiple batteries can be utilized for the battery backup system 40.

The alarm 10 includes a user interface 106. The user interface 106 includes a display 32. By way of example, the display 32 is an LCD display. The display 32 enables an operator to view parameters such as a signal strength indicator, a county code indicator, and a sub-county code indicator. By way of example, with the signal strength indicator the processor 112 is configured to allow an operator, through the user interface 106, to select the frequency of reception of the receiver 104 based on a frequency determination from review of the signal strength indicator. Also, by way of example, with the county code indicator the processor 112 is configured to allow an operator, through the user interface, to select an applicable county code based on a geographical location or to leave the county code field without a data input in order to default to all counties within a local range of the weather alarm 10. Further, by way of example, with the sub-county code the processor 112 is configured to allow an operator, through the user interface, to select an applicable sub-county code based on geography or to leave the sub-county code field without a data input in order to default to all regions within a county. The display 32 also enables other parameter displays helpful in configurations to the alarm 10.

The user interface includes a multiplicity of configuration options and buttons. By way of example, the user interface includes a MUTE button 18, by which the alarm 10 can be muted. The user interface 106 includes a BACK button 24. The BACK button 24 is utilized to navigate through menus on the display 32, including creating a backup of the data in the device to place within memory 116. The user interface includes an ENTER button 26. The ENTER button 26 is utilized to navigate through menus on the display 32. The user interface 106 includes a FREQUENCY button 28. The FREQUENCY button 28 is utilized to select a frequency. The user interface 106 includes a COUNTY button 30. The COUNTY button 30 is utilized to select a county and/or sub-county region.

Figure 12:
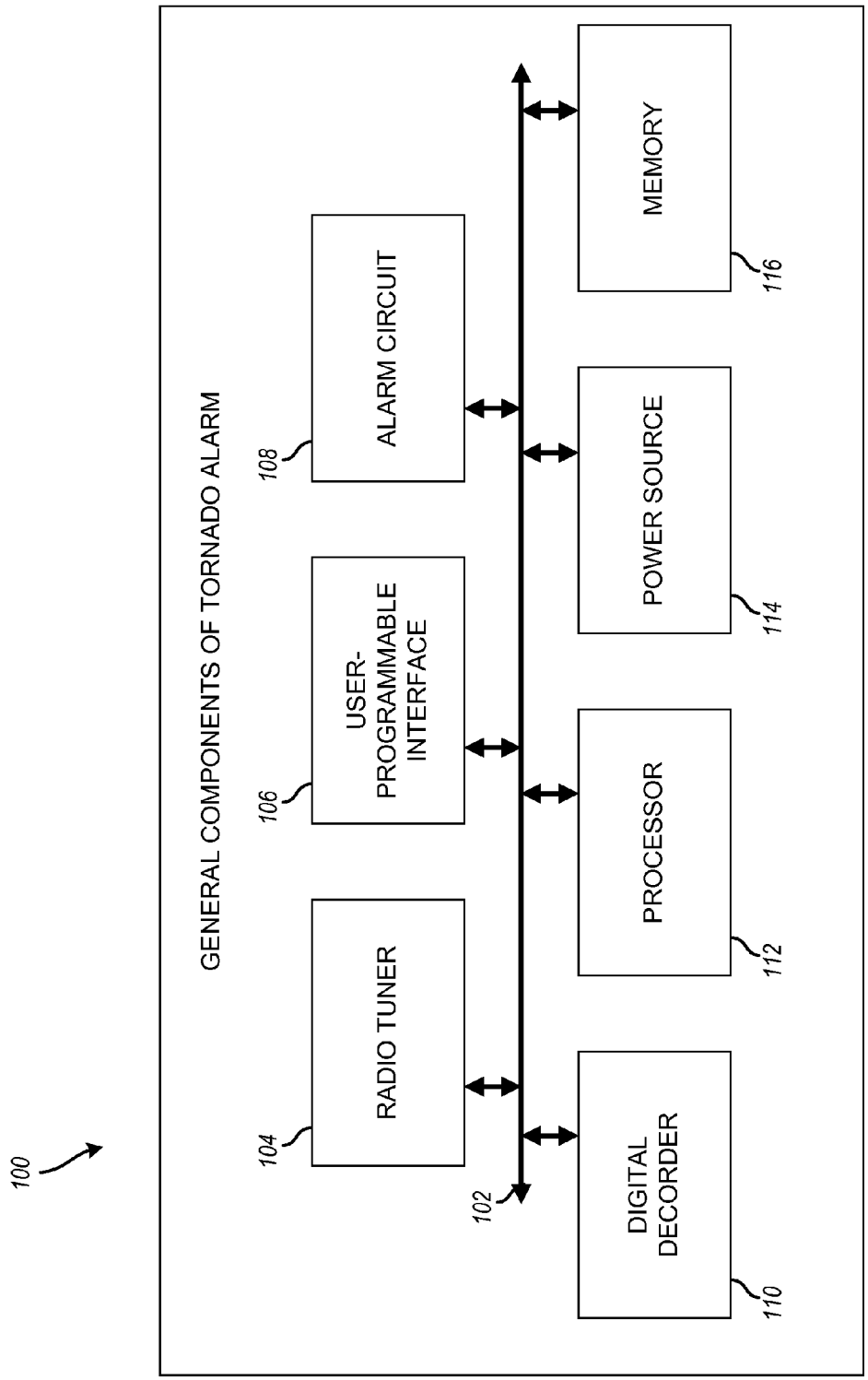
FIG. 12 is a schematic diagram illustrating communications between the components of the tornado alarm system, according to an embodiment of the technology described herein.

Referring now specifically to FIG. 12, block diagram 100 depicts the general components of the single event severe weather alarm 10. The alarm 10 components depicted here can be implemented in circuit board 48 and electronics module 50. As depicted the various components in the diagram 100 are in communication with one another via a common bus 102, which is, for example, circuit board 48 and electronics module 50.

The alarm 10 includes a radio tuner receiver 104 disposed within the housing 22. By way of example, receiver 104 is a VHF radio receiver. The receiver 104 is configured to receive signals and Specific Area Message Encoding (SAME) messages at one or more National Weather Service (NWS) weather radio frequencies.

The alarm 10 includes a user interface 106, as described above. The user interface 106 includes a display 32 and a multiplicity of configuration buttons 18, 24, 26, 28, 30.

The alarm 10 is actuated by an alarm circuit 108. Upon actuation, the audio siren emits a loud alarm through loud speaker 20, described above.

The alarm 10 includes a digital decoder 110 disposed coupled to the receiver 104 and configured to filter out all SAME messages except for a single weather warning message event code and a Required Weekly Test (RWT) code. The single weather warning message event code is, for example, the Tornado Warning code (TOR). Dependent on the intended use and relevant weather for a given area, alternate warnings can be monitored.

The alarm 10 includes a processor 112 coupled to the receiver and the digital decoder. The processor 112 controls the receiver and decoder and actuates the audio siren upon the occurrence of the predetermined event through the alarm circuit 108. In at least one embodiment, the processor 112 is configured to automatically select the frequency of reception of the receiver based on a geographical location and a signal strength indication.

The alarm 10 includes a power source 114. As described above, the power source 114 can be a battery 40. The power source 114 also can be an AC adapter, car adapter, boat adapter, or the like. Further, the power source 114 can be accessed through electrical prongs 34 or directly wired into the power source providing electrical power to a home or other building.

The alarm 10 includes a memory 116 for storing a plurality of signal values and frequencies, a plurality of message values, and a plurality of geographical codes, even after an interruption in the power source. The data stored in memory 116 can be manipulated by an operator through the user interface 106. In at least one embodiment, certain data fields stored within the memory 116 are not accessible for manipulation by an operator, but rather are hard programmed at the point of manufacture before use and user configuration.

Figure 13:
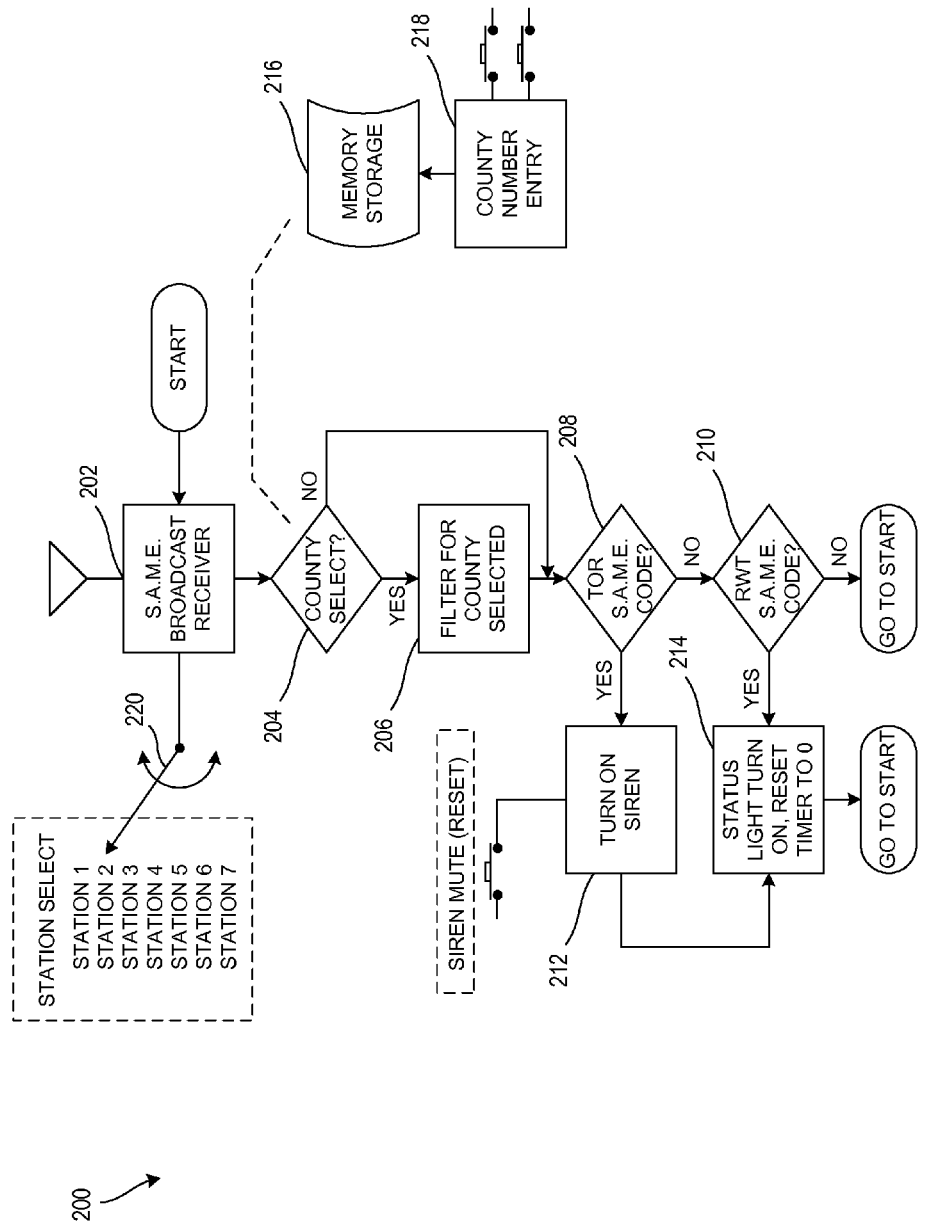
FIG. 13 is a flowchart diagram illustrating receipt of a National Weather Service signal and subsequent processing by the tornado alarm system, according to an embodiment of the technology described herein.

Referring now specifically to FIG. 13, flowchart diagram 200 depicts multiple logic steps of the severe weather alarm 10 and its analysis of received signals. Flowchart 200 depicts the receipt of a National Weather Service signal and subsequent processing by the single event severe weather alarm 10.

At step 202 a signal from the National Weather Service, such as a Specific Area Message Encoding (SAME) message, is received, on a frequency determined at step 220. As depicted, the stations 1 through 7 are representative of the weather messages broadcast on the following weather channels, or frequencies: 162.400 MHz, 162.425 MHz, 162.450 MHz, 162.475 MHz, 162.500 MHz, 162.525 MHz, and 162.550.

At step 204 an inquiry is made as to whether a county has been selected. The alarm 10 is to be configured to operate in a geographical region, such as a county, to receive the appropriate weather messages relevant to that county. If no county is selected, proceed to step 208. If a county is selected already, and does not need to be changed, proceed to step 206. County data is stored in memory element 216. County information can be entered and/or selected through the user interface 106, such as with the COUNTY button 30, depicted in earlier Figures.

At step 206 the severe weather alarm 10 filters for the county selected in step 204. This ensures that only the relevant weather messages are received to consider for potential actuation of the siren within alarm 10.

At step 208 an inquiry is made as to whether any of the Specific Area Message Encoding (SAME) messages is the programmed single weather warning message event code, such as, for example, the Tornado Warning (TOR) message code. If the programmed single weather warning message event code is received, proceed to step 212 to actuate the audio siren. If the programmed single weather warning message event code has not been received, proceed to step 210, for the weekly test.

At step 210 it is inquired whether the Required Weekly Test (RWT) message code is received from the National Weather Service. If the RWT message code has been received, proceed to step 214. If the RWT message code has not yet been received, proceed to the START of the flowchart sequence steps.

At step 212, upon receipt of the single weather warning message event code in step 208, the siren is actuated. The siren indicates that the specific weather event being monitored, such as the Tornado Warning (TOR) message code, has occurred. The siren can be muted, or reset, through the user interface 106 with the MUTE button 18. The audio siren can be programmed and controlled to time out (shut off) after a predetermined time period.

At step 214, upon receipt of RWT message code in step 210, the test/state indicator 14 is turned on and the timer is reset to a zero value. The START of the flowchart sequence steps is repeated.

In at least one embodiment, these logic steps are implemented in a software implemented logic circuit coupled to the digital decoder 110 and processor 112 and configured to filter out all SAME messages except for single the warning message event code and the Required Weekly Test (RWT) code. In at least one embodiment, the processor 112 is configured to deny access by an operator of the single event severe weather alarm to the digital decoder 110.

Although this technology has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the invention and are intended to be covered by the following claims.

What is claimed is:

1. A single event severe weather alarm comprising:
   a portable electronic device housing;
   an audio siren, having a volume preset to remain unmanipulated by an operator, and thus not raised, lowered, or turned off, disposed within the housing and configured to actuate upon an occurrence of a predetermined specific weather phenomenon and to very loudly indicate with a loud alarm with no voice, once actuated, the occurrence of the specific weather phenomenon;
   a Specific Area Message Encoding (SAME) broadcast receiver disposed within the housing and configured to receive signals transmitted to a specific geographic area and configured to receive SAME messages at one or more National Weather Service (NWS) weather radio frequencies;

a digital decoder disposed within the housing coupled to the SAME broadcast receiver and configured to filter out all SAME messages except for a single weather warning message event code, indicative of the occurrence of the specific weather phenomenon, and a Required Weekly Test (RWT) code;

a processor coupled to the receiver and the digital decoder configured to control the SAME broadcast receiver and decoder and to actuate the audio siren upon the occurrence of the predetermined specific weather phenomenon;

a power source;

a memory for storing a plurality of signal values and frequencies, a plurality of message values, and a plurality of geographical codes, even after an interruption in the power source;

a user interface coupled to the processor;

a "mute" selection, a "back" selection, an "enter" selection, a "frequency" selection, and a "county" selection each disposed upon the user interface;

a visual display coupled to the user interface; and a signal strength indicator visible on the visual display;

a flip cover, configured to operatively cover the visual display; and wherein the processor is configured to automatically select the frequency of reception of the receiver based on a geographical location and a signal strength indication; and wherein the processor is configured to allow an operator, through the user interface, to select the frequency of reception of the receiver based on a frequency determination from review of the signal strength indicator.

2. The single event severe weather alarm of claim 1, wherein the single warning message event code is the Tornado Warning code (TOR).

3. The single event severe weather alarm of claim 1, further comprising:
a county code indicator visible on the visual display;
wherein the processor is configured to allow an operator, through the user interface, to select an applicable county code based on a geographical location or to leave the county code field without a data input in order to default to all counties within a local range of the weather alarm.

4. The single event severe weather alarm of claim 1, further comprising:
a sub-county code indicator visible on the visual display, indicative of a region within a county;
wherein the processor is configured to allow an operator, through the user interface, to select an applicable sub-county code based on geography or to leave the sub-county code field without a data input in order to default to all regions within a county.

5. The single event severe weather alarm of claim 1, further comprising:
a software implemented logic circuit coupled to the digital decoder and configured to filter out all SAME messages except for single the warning message event code and the Required Weekly Test (RWT) code;
wherein the processor is configured to deny access by an operator of the single event severe weather alarm to the digital decoder.

6. The single event severe weather alarm of claim 1, further comprising:

a battery backup system disposed within the housing to provide power to the single event severe weather alarm and to provide portability of the single event severe weather alarm.

7. The single event severe weather alarm of claim 1, further comprising:
a test indicator light, controlled by the processor, to indicate a current state of the single event severe weather alarm and to indicate whether the Required Weekly Test (RWT) code was processed properly.

8. The single event severe weather alarm of claim 7, wherein the test indicator is configured to illuminate regularly in a first color and subsequently to change illumination to a second color upon receipt and process of the Required Weekly Test (RWT) code.

9. The single event severe weather alarm of claim 1, further comprising:
a retractable electrical prong assembly to plug the single event severe weather alarm into a traditional power source outlet and with which to mount the alarm flush to a wall surface.

10. The single event severe weather alarm of claim 1, further comprising:
a strobe light disposed with the housing to indicate to those who cannot hear that the siren has been activated.

11. The single event severe weather alarm of claim 1, wherein the single event severe weather alarm is hardwired into a traditional wiring system within a building; and wherein the power source is a power supply of the building.

12. A tornado warning device comprising:
a portable electronic device housing;
an audio siren, having a volume preset to remain unmanipulated by an operator, and thus not raised, lowered, or turned off, disposed within the housing and configured to actuate upon an occurrence of a predetermined specific weather phenomenon and to very loudly indicate with a loud alarm with no voice, once actuated, the occurrence of the specific weather phenomenon;
a Specific Area Message Encoding (SAME) broadcast receiver disposed within the housing and configured to receive signals transmitted to a specific geographic area and configured to receive SAME messages at one or more National Weather Service (NWS) weather radio frequencies;
a digital decoder disposed within the housing coupled to the SAME broadcast receiver and configured to filter out all SAME messages except for a single weather warning message type of Tornado Warning code (TOR), indicative of the occurrence of the specific weather phenomenon, and a Required Weekly Test (RWT) code;
a processor coupled to the receiver and the digital decoder configured to control the SAME broadcast receiver and decoder and to actuate the audio siren upon the occurrence of the predetermined specific weather phenomenon;
a power source;
a memory for storing a plurality of signal values and frequencies, a plurality of message values, and a plurality of geographical codes, even after an interruption in the power source; and
a test indicator light, controlled by the processor, to indicate a current state of the single event severe weather alarm and to indicate whether the Required Weekly Test (RWT) code was processed properly, wherein the test indicator is configured to illuminate in a first color and to change illumination to a second color upon receipt and process of the Required Weekly Test (RWT) code;

a user interface coupled to the processor;
a "mute" selection, a "back" selection, an "enter" selection, a "frequency" selection, and a "county" selection each disposed upon the user interface;
a visual display coupled to the user interface; and
a flip cover, configured to operatively cover the visual display;
a signal strength indicator visible on the visual display;
wherein the processor is configured to automatically select the frequency of reception of the receiver based on a geographical location and a signal strength indication; and
wherein the processor is configured to allow an operator, through the user interface, to select the frequency of reception of the receiver based on a frequency determination from review of the signal strength indicator.

13. The tornado warning device of claim 12, further comprising:
a signal strength indicator visible on the visual display, wherein the processor is configured to allow an operator, through the user interface, to select the frequency of reception of the receiver based on a frequency determination from review of the signal strength indicator;
a county code indicator visible on the visual display, wherein the processor is configured to allow the operator, through the user interface, to select an applicable county code based on a geographic location or to leave the county code field without a data input in order to default to all counties with a local range of the weather alarm; and
a sub-county code indicator visible on the visual display, indicative of a region within a county, wherein the processor is configured to allow the operator, through the user interface, to select an applicable sub-county code based on geography or to leave the sub-county code field without a data input in order to default to all regions within a county.

14. The tornado warning device of claim 12, further comprising:
a retractable electrical prong assembly to plug the single event severe weather alarm into a traditional power source outlet and with which to mount the alarm to a wall surface;
a strobe light to indicate to those who cannot hear that the siren has been activated;
a software implemented logic circuit coupled to the digital decoder and configured to filter out all SAME messages except for single the warning message event code and the Required Weekly Test (RWT) codes, wherein the processor is configured to deny access by an operator of the single event severe weather alarm to the digital decoder; and
a battery backup system disposed within the housing to provide power to the single event severe weather alarm and to provide portability of the single event severe weather alarm;
wherein the volume of the audio siren is preset to remain unmanipulated by an operator, and thus not raised, lowered, or turned off; and
wherein the processor is configured to automatically select the frequency of reception of the receiver based on geography and signal strength.

15. A method to indicate the occurrence of a severe weather alert, the method comprising:
providing a single event severe weather alarm having: a portable electronic device housing; an audio siren, having a volume preset to remain unmanipulated by an operator, and thus not raised, lowered, or turned off, disposed within the housing and configured to actuate upon an occurrence of a predetermined specific weather phenomenon and to very loudly indicate with a loud alarm with no voice, once actuated, the occurrence of the specific weather phenomenon; a Specific Area Message Encoding (SAME) broadcast receiver disposed within the housing and configured to receive signals transmitted to a specific geographic area and configured to receive SAME messages at one or more National Weather Service (NWS) weather radio frequencies; a digital decoder disposed within the housing coupled to the SAME broadcast receiver and configured to filter out all SAME messages except for a single weather warning message event code, indicative of the occurrence of the specific weather phenomenon, and a Required Weekly Test (RWT) code;
a processor coupled to the receiver and the digital decoder configured to control the SAME broadcast receiver and decoder and to actuate the audio siren upon the occurrence of the predetermined specific weather phenomenon; a power source; a memory for storing a plurality of signal values and frequencies, a plurality of message values, and a plurality of geographical codes, even after an interruption in the power source; a test indicator light, controlled by the processor, to indicate a current state of the single event severe weather alarm and to indicate whether the Required Weekly Test (RWT) code was processed properly, wherein the test indicator is configured to illuminate in a first color and to change illumination to a second color upon receipt and process of the Required Weekly Test (RWT) code; a user interface coupled to the processor, a "mute" selection, a "back" selection, an "enter" selection, a "frequency" selection, and a "county" selection each disposed upon the user interface; a visual display coupled to the user interface; a flip cover, configured to operatively cover the visual display; and a signal strength indicator visible on the visual display; wherein the processor is configured to automatically select the frequency of reception of the receiver based on a geographical location and a signal strength indication; and wherein the processor is configured to allow an operator, through the user interface, to select the frequency of reception of the receiver based on a frequency determination from review of the signal strength indicator;
determining whether a county code has been selected for the alarm;
selecting, if not previously selected or if reselecting, a county code;
filtering the receiver for the county code selected;
receiving SAME messages;
processing the received SAME messages to identify whether the a single weather warning message event code has been received, and upon receipt of the a single weather warning message event code to actuate the audio siren; and
processing received SAME messages to identify whether a Required Weekly Test (RWT) code has been received, and upon receipt of the RWT code to actuate the test indicator light to indicate the state of the alarm and the last weekly test.

16. The method of claim 15, wherein the single warning message event code is the Tornado Warning code (TOR).

* * * * *